US006945718B2

(12) United States Patent
Hirose

(10) Patent No.: US 6,945,718 B2
(45) Date of Patent: Sep. 20, 2005

(54) PRINT SYSTEM WHICH ANALYZES PROCESSING SPEED AND A METHOD FOR KEEPING TRACK OF PRINTING PROCESS STATUS

(75) Inventor: Kiyotaka Hirose, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/718,263

(22) Filed: Nov. 20, 2003

(65) Prior Publication Data

US 2004/0161275 A1 Aug. 19, 2004

(30) Foreign Application Priority Data

Nov. 25, 2002 (JP) ........................................ 2002-341113

(51) Int. Cl.[7] .......................... B41J 11/44; B41J 11/26; B41J 2/315; G06K 15/00
(52) U.S. Cl. .................... 400/76; 400/611; 400/120.15; 358/1.15; 358/1.13
(58) Field of Search ..................... 400/76, 611, 120.15; 358/1.15, 1.13

(56) References Cited

U.S. PATENT DOCUMENTS

| | | | | | |
|---|---|---|---|---|---|
| 5,274,461 | A | * | 12/1993 | Mitsuhashi | ................. 358/296 |
| 5,293,463 | A | * | 3/1994 | Masuda | ...................... 358/1.1 |
| 5,337,258 | A | * | 8/1994 | Dennis | ........................ 714/47 |
| 5,473,741 | A | * | 12/1995 | Neufelder et al. | .......... 345/619 |
| 6,493,099 | B2 | * | 12/2002 | Nakagiri | .................... 358/1.13 |
| 6,816,276 | B2 | * | 11/2004 | Sugano | ..................... 358/1.15 |
| 2001/0043358 | A1 | * | 11/2001 | Schwartz | ................... 358/1.15 |
| 2002/0060805 | A1 | * | 5/2002 | Tomita | ...................... 358/1.15 |

FOREIGN PATENT DOCUMENTS

| | | | | |
|---|---|---|---|---|
| JP | 10-315576 A | * | 12/1998 | ............. B41J/29/38 |
| JP | 2000-020263 | * | 1/2000 | ............. G06F/3/12 |
| JP | 2000-293327 | | 10/2000 | ............. G06F/3/12 |
| JP | 2001-100969 | | 4/2001 | ............. G06F/3/12 |
| JP | 2001-100970 | | 4/2001 | ............. G06F/3/12 |
| JP | 2002-248837 | | 9/2002 | ............. B41J/29/38 |

OTHER PUBLICATIONS

Chambers Dictionary of Science and Technology, 1999, p. 1082.*
Patent Abstracts of Japan, Publication No. 2002–248837 dated Sep. 3, 2002 (1 pg.).
Patent Abstracts of Japan, Publication No. 2001–100970 dated Apr. 13, 2001 (1 pg.).
Patent Abstracts of Japan, Publication No. 2001–100969 dated Apr. 13, 2001 (1 pg.).
Patent Abstracts of Japan, Publication No. 2000–293327 dated Oct. 20, 2000 (1 pg.).

* cited by examiner

*Primary Examiner*—Andrew H. Hirshfeld
*Assistant Examiner*—Wasseem H. Hamdan
(74) *Attorney, Agent, or Firm*—Osha·Liang LLP

(57) ABSTRACT

A print system has a printer host and a printer. The printer host generates print data based on image data and outputs the print data to the printer. The printer interprets the received print data and prints an image based on the print data. The print system calculates a processing time for print data generation, output and interpretation. Consequently, it is possible to know the processing times for each stage in the printing process.

2 Claims, 5 Drawing Sheets

FIG.3

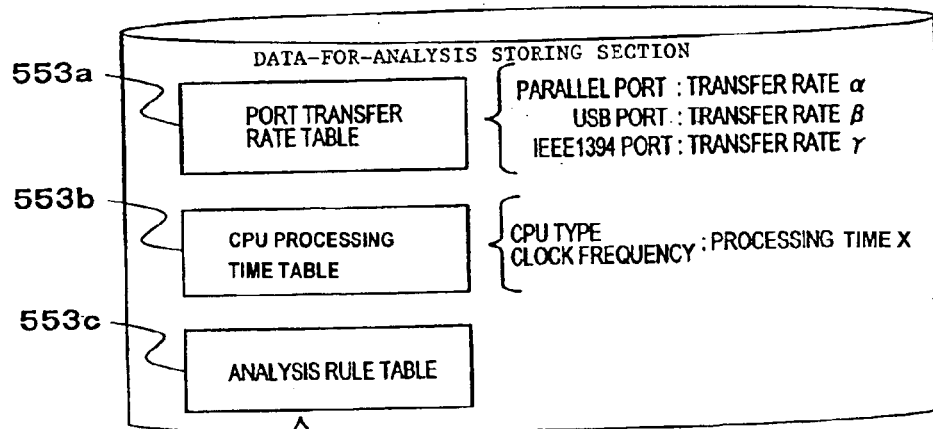

| MEASUREMENT RESULTS | PROCESSES | CONTENTS TO BE DISPLAYED |
|---|---|---|
| $a1 \approx a2 \approx b \approx c$ | — | "PRINTING PROCESS IS EFFICIENTLY EXECUTED IN THE PRINT SYSTEM CURRENTLY USED." |
| $a1 > a2 \approx b < c$ | 1) OBTAIN CURRENTLY USED PORT<br>2) DETECT A AVAILABLE PORT<br>3) REFER TO A TABLE AND DETERMINE A COUNTERMEASURE | "DUE TO A LOW DATA TRANSFER RATE, DATA PROCESSING TIME OF THE PRINTER AND DATA GENERATING ABILITY OF THE COMPUTER ARE NOT EFFICIENTLY USED."<br>"THE CURRENTLY USED PORT IS" XXX.<br>"BY REPLACING WITH" YYY, THE PRINT PROCESSING TIME CAN BE IMPROVED BY" ZZZ "%". |
| $a1 > a2 \approx b \approx c$ | 1) OBTAIN INFORMATION AS TO CURRENTLY USED CPU<br>2) REFER TO A TABLE AND DETERMINE A COUNTERMEASURE | "DUE TO A LOW DATA GENERATION PROCESSING TIME, PROCESSING ABILITY OF THE PRINTER IS NOT EFFICIENTLY USED."<br>"CURRENTLY USED CPU IS" XXX."BY REPLACING WITH THE CPU OF" YYY," THE PRINT PROCESSING TIME CAN BE IMPROVED BY" ZZZ "%". |
| $a1 \approx a2 \approx b < c$ | 1) SEARCH OTHER PRINTER ON THE NETWORK<br>2) OBTAIN A MAXIMUM PROCESSING ABILITY VALUE AND DETERMINE A COUNTERMEASURE | "DUE TO A LOW PROCESSING ABILITY OF THE PRINTER, PROCESSING ABILITY OF THE COMPUTER IS NOT EFFICIENTLY USED."<br>"CURRENTLY USED PRINTER IS" XXX. "IF PRINTING IS EXECUTED BY THE PRINTER" YYY, "THE PRINT PROCESSING TIME CAN BE IMPROVED BY" ZZZ "%". |
| $b < c$ | SUPPRESS CPU POWER SO AS TO OBTAIN $c \approx b$ | "COMPARING TO PROCESSING ABILITY OF THE PRINTER, CPU POWER IS EXCESSIVE. CPU LOAD ON THE PRINTING PROCESS WILL BE SUPPRESSED." |

PRINT SYSTEM WHICH ANALYZES PROCESSING SPEED AND A METHOD FOR KEEPING TRACK OF PRINTING PROCESS STATUS

FIELD OF THE INVENTION

The present invention relates to a print system, and more particularly, it relates to a print system which analyzes a processing time of printing process.

BACKGROUND OF THE INVENTION

When a print system comprising a printer host and a printer carries out a printing process, an actual printing is executed by way of a plurality of processing stages. These stages may include the followings: a stage where print data is generated based on image data and the generated print data is stored as a spool file, a stage where the spool file is read out while a status of the printer is monitored and the spool file is outputted to the printer as print data, and a stage where the print data is interpreted so as to execute printing, and the like.

Processes in each stage are carried out mainly by hardware such as a CPU of the printer host, an output port of the printer host and a CPU of the printer.

Since a throughput of the hardware is different from each other, even when the processing time of one piece of hardware is quite high, the processing time as a whole system may be rendered low, if the processing time of another piece of hardware is low.

As a related art regarding the printing process time, Japanese Patent laid-open Publication No. 2002-248837 discloses that a printing time when ink of four colors, CMYK (Cyan, Magenta, Yellow, black) is used, and a printing time when ink of six colors, CMYKcm (Cyan, Magenta, Yellow, black, light cyan, light magenta) is used, are obtained, and in accordance with a user's desire, the printing time is shortened.

Japanese Patent laid-open Publications No. 2001-100970 and No. 2001-100969 disclose that a process time of a color conversion/half-tone processing and a transfer time to a printer are measured as to a part of RGB image data. Then, it is determined which of an RGB image data command and a CMYKcm binarized image data command completes a process in a shorter time. When the remaining RGB image data is printed, a switching operation is performed so that the time up to when a printer executes printing as to a drawing command can be shortened.

Japanese Patent laid-open Publication No. 2000-293327 discloses that a printing controller comprises at least a print managing section which generates print data for making a printer execute printing in a prescribed manner and a transfer control section which transfers the print data periodically to the printer while buffering the print data. The transfer control section detects a transfer rate of each cycle, dynamically changes the buffer size for print data of the next cycle in accordance with the transfer rate of the preceding cycle and suppresses the down time of the printer and the print data managing section. The print data items in the first cycle are buffered in a buffer size that is minimally necessary for the printer to start printing, and when the total value of the buffer sizes reaches a prescribed value, the buffer size for the print data of the subsequent cycles is made close to a maximum size in which the most efficient transfer can be performed. Then, it is possible to effectively utilize resources.

SUMMARY OF THE INVENTION

If a desired printing process time cannot be obtained, replacement of hardware or the like may be conceivable so as to increase the printing process time. In such a case, it is the most effective to replace hardware which is a bottleneck for enhancing the printing process time.

However, in the related arts, it is not possible to detect which hardware is a bottleneck out of the entire hardware pieces, such as a CPU of a printer host that executes a stage of storing a spool file, an output port of the printer host that executes a stage of reading out the spool file while monitoring a printer status and outputting the print data to the printer, and a CPU of the printer that executes a stage of interpreting the print data to perform printing. Therefore, an effective replacement of hardware is difficult.

A feature of the present invention is to provide a function to know a processing time of each stage in a printing process.

In order to solve the problem above, according to the present invention, there is provided a print system having a printer host and a printer, the printer host generating print data based on image data and outputting the print data to the printer, and the printer interpreting the print data thus received and printing an image based on the print data, the print system comprising, a print data generation processing time calculating means which calculates a processing time for generating the print data;

a print data output processing time calculating means which calculates a processing time for outputting the print data;

a print data interpretation processing time calculating means which calculates a processing time for interpreting the print data; and a processing time analyzing means which obtains a print data generation processing time calculated by the print data generation processing time calculating means, a print data output processing time calculated by the print data output processing time calculating means and a print data interpretation processing time calculated by the print data interpretation processing time calculating means, and outputs image data for displaying each processing time thus obtained.

Since the processing time analyzing means obtains a processing time from each means which performs the printing process and displays each processing time, it is possible for a user to know the processing time on each stage in the printing process.

Here, the print system further comprises a printer ability storing means which stores a maximum processing time for interpreting the print data of the printer, wherein the processing time analyzing means obtains from the printer ability storing means the maximum processing time for interpreting the print data, and includes a display of the maximum print data interpreting processing time thus obtained in the image data.

Accordingly, it is possible to know how much of the ability is actually utilized, out of the maximum processing ability of the printer.

The print system further comprises an analysis information storing means which stores an analysis rule which defines processes to be performed by the processing time analyzing means and contents to be displayed with regard to printing process statuses, respectively corresponding to relationships among the print data generation processing time, the print data output processing time, the print data interpretation processing time, and the maximum print data interpretation processing time, wherein, the processing time analyzing means refers to the analysis rule, and performs a process as defined in the analysis rule, based on thus obtained print data generation processing time, print data output processing time, print data interpretation processing time and maximum print data interpretation processing time, as well as including in the image data, the contents to be displayed that are defined in the analysis rule.

Accordingly, it is possible for the user to know in what status is the printing process in the print system, based on the processing time in each means.

The processes to be performed by the processing time analyzing means, which are defined in the analysis rule, may include a process for suppressing the print data generation processing time of the print data generation processing time calculating means.

Then, an excessive ability of the print data generation processing time calculating means may be allocated to other processes in the print system.

Further, in order to solve the problems above, according to the present invention, there is provided a method for keeping track of printing process status in a print system having a printer host and a printer, the printer host generating print data based on image data and outputting the print data to the printer, and the printer interpreting the print data thus received and printing an image based on the print data, wherein, a print data generation processing time is calculated based on a print data amount generated within a unit of time, a print data output processing time is calculated based on an outputted print data amount within a unit of time, a print data interpretation processing time is calculated based on the print data amount interpreted within a unit of time, and each processing time thus calculated is displayed.

BRIEF DESCRIPTION OF THE DRAWINGS

FIG. 3 is a diagram showing a configuration of data-for-analysis, which is stored in data-for-analysis storing section 553.

DETAILED DESCRIPTION OF THE PREFERRED EMBODIMENTS

Preferred embodiments of the present invention will be explained with reference to the attached drawings.

Figure 1:
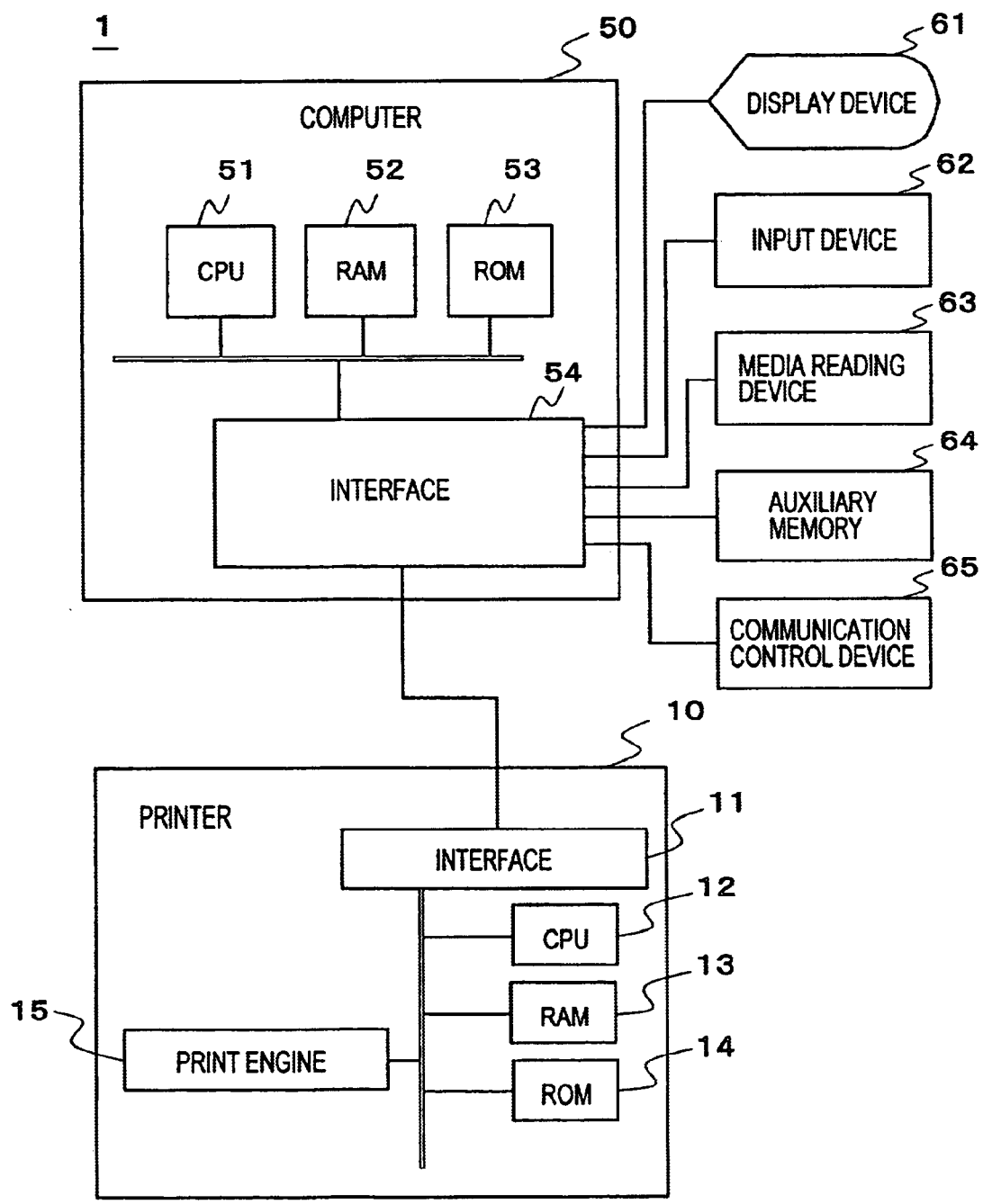
FIG. 1 is a block diagram schematically showing hardware configuration of the print system 1.

FIG. 1 is a block diagram showing an example of hardware configuration of a print system to which the present invention is applicable. As shown in FIG. 1, the print system 1 comprises a computer 50 which functions as a printer host by executing a printer control program, and a printer 10 which functions as a printing device. It is to be noted that the configuration of the print system 1 is not limited to the one as shown in FIG. 1. For example, the print system may be a network print system having a plurality of computers 50 and a plurality of printers 10.

The computer 50 comprises a CPU (Central Processing Unit) 51 which performs processing based on various programs, RAM (Random Access Memory) 52 which temporarily stores data, programs and the like, ROM (Read Only Memory) 53 which previously stores various data for controlling the computer 50, a start-up program and the like in nonvolatile manner, and an interface 54 which is responsible for sending/receiving data to/from connected peripheral devices.

The interface 54 is provided with an output port, which is a connector portion to establish a connection with the printer 10. The interface 54 is provided with, for example, a plurality of output ports, which respectively have standards different in transfer rate, such as USB, IEEE1394, and the like. A user selects one output port to be used out of the plurality of output ports, and establishes a connection between the printer 10 and the computer 50.

The computer 50 is connected, via an interface 54, with a display device 61 such as a color display, an input device 62 such as a mouse and a keyboard, a media reading device 63 which reads data from a recording medium such as a CD-ROM, an internal or external auxiliary memory 64 and a communication control device 65 to establish a connection with the computer network. However, the configuration of the computer 50 is not limited to the one as described above.

The printer 10 is, for example, an ink-jet color printer. The ink-jet color printer is provided with a plurality of ink cartridges each filled with ink within a case, and printing is carried out by spraying the ink from an ink head onto a medium to be printed, such as recording paper. It is to be noted that the printing manner of the printer 10 is not limited to ink jet type. For example, it may be a laser printing with toner.

The printer 10 comprises an interface 11 which is responsible for a communication with the computer 50, such as data receiving and sending, a CPU 12 which performs a processing based on various programs, RAM 13 which temporarily stores the print data and the like, ROM 14 which previously stores various data and various programs and the like for controlling the printer 10 in nonvolatile manner, a print head which discharges ink, a carriage driving mechanism which drives a carriage mounting the print head, and a print engine 15 which includes a paper feed mechanism, and a paper feed/eject mechanism and the like, which performs paper feeding and ejecting process as to the medium to be printed. It is to be noted the configuration of the printer 10 is not limited to the one as described above.

The computer 50 and the printer 10 are provided with so called two-way communicating function, and the computer 50 is capable of obtaining from the printer 10, status information indicating the status of the printer 10 and other information.

Figure 2:
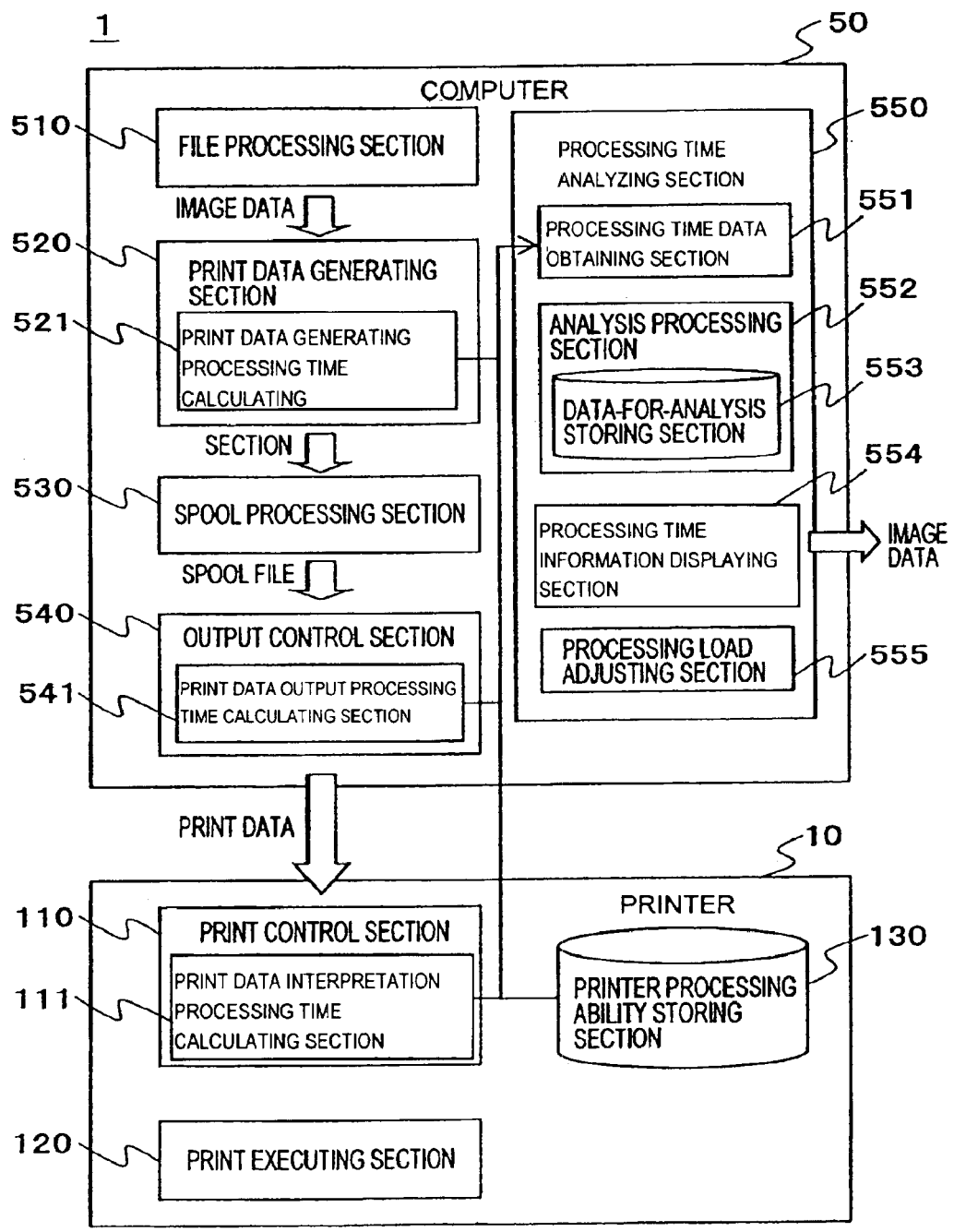
FIG. 2 is a block diagram showing a functional configuration of the print system 1.

FIG. 2 is a block diagram showing a functional configuration, which is implemented in the computer 50 and the printer 10 in the present embodiment.

As shown in FIG. 2, on the computer 50, a file processing section 510, a print data generating section 520, a spool processing section 530, an output control section 540 and processing time analyzing section 550 are implemented.

The file processing section 510 is provided with a function for document processing and image processing and the like, and it carries out various processes to the files to be printed. Further, when the file processing section 510 receives a print command from a user, it outputs image data of the file which is being processed. The file processing section 510 is implemented on the computer 50 when the CPU 51 executes an application program which is loaded on the RAM 52.

The print data generating section 520 reads the image data, generates print data in a command format which is able to be interpreted by the printer 10, and outputs the print data to the spool processing section 530. Generation of the print data is performed by the following processes: a rasterizing process which expands the image data to a dot-aggregation image data, a half tone process where the dot-aggregation image data is subjected to color conversion process and gray-scale process, and a command conversion process which converts thus processed dot-aggregation image data to print data.

In the present embodiment, the print data generating section 520 is provided with a print data generation processing time calculating section 521. The print data generation processing time calculating section 521 calculates a processing time of the print data generating section 520 for generating the print data. For example, the processing time for generating the print data can be defined as the number of bytes of the print data, which is generated within a unit of time. In this case, the print data generation processing time calculating section 521 is capable of calculating a processing time for generating the print data by integrating a size of each command constituting the print data which has been generated within a unit of time (for example, one second).

The print data generating section 520 is implemented on the computer 50 when the CPU 51 executes a printer driver program which is loaded on the RAM 52.

The spool processing section 530 temporarily stores in the auxiliary memory 64, the print data generated by the print data generating section 520 as a spool file. The spool processing section 530 is implemented on the computer 50, for example, when the CPU 51 executes a spooler program which is loaded on the RAM 52.

The output control section 540 reads the spool file and outputs the print data to the printer 10 from the output port, while monitoring a status of the printer 10.

In the present embodiment, the output control section 540 is provided with a print data output processing time calculating section 541. The print data output processing time calculating section 541 calculates a processing time at which the output control section 540 outputs the print data. The processing time for outputting the print data can be defined as the number of bytes of the print data which is outputted to the printer 10 within a unit of time. In this case, the print data output processing time calculating section 541 is capable of calculating a processing time for outputting the print data by integrating a size of each command constituting the print data, which has been outputted within a unit of time (for example, one second).

The output control section 540 is implemented on the computer 50 when the CPU 51 executes a port driver program and a port monitor program, which are loaded on the RAM 52.

The processing time analyzing section 550 comprises a processing time data obtaining section 551, an analysis processing section 552, a processing time information displaying section 554 and a process load adjusting section 555.

The processing time data obtaining section 551 obtains each of the following processing times: a print data generation processing time calculated by the print data generation processing time calculating section 521, a print data output processing time calculated by the print data output processing time calculating section 541, a print data interpretation processing time calculated by a print data interpretation processing time calculating section 111 as described below, and a maximum print data interpretation processing time stored in the printer processing ability storing section 130 as described below. The print data generation processing time and the print data output processing time can be obtained, for example, via a file, a predetermined memory area and the like. The print data interpretation processing time and the maximum print data interpretation processing time can be obtained by use of the two-way communicating function between the computer 50 and the printer 10.

The analysis processing section 552 analyzes a status of printing process of the print system 1, based on the processing time data thus obtained. A benchmark and the like to be used for the analysis are previously stored in the data-for-analysis storing section 553.

FIG. 3 is a diagram showing a configuration of the data-for-analysis, which is stored in the data-for-analysis storing section 553. As shown in FIG. 3, the data-for-analysis storing section 553 comprises a port transfer rate table 553*a*, a CPU processing time table 553*b*, and an analysis rule table 553*c*.

The port transfer rate table 553*a* is a table on which a standard transfer rate by output port is recorded. The transfer rate can be defined by the number of transferred bytes within a unit of time, an index number with respect to a certain port, or the like.

The CPU processing time table 553*b* is a table which records a reference index of CPU processing time, which is expected based on the CPU type and its clock frequency. The CPU processing time can be defined, for example, by utilizing a result of a predetermined benchmark test.

The analysis rule table 553*c* is a table which defines processes to be performed by the analysis processing section 552 in response to each processing time obtained by the processing time data obtaining section 551, and contents to be displayed as an analysis result.

Here, the maximum print data interpretation processing time of the printer 10, an actual print data generation processing time of the printer 10, the print data output processing time of the output control section 540, and print data generation processing time of the print data generating section 520 are respectively assumed as "a1", "a2", "b" and "c". Then, one example of the analysis rule table 553 will be explained.

For example, the case where "a1"≈(Nearly equal) "a2"≈"b"≈"c" represents that the maximum print data interpretation processing time of the printer, the actual print data interpretation processing time, the print data generation processing time and the print data output processing time are approximately equal. Therefore, a particular processing is not performed, and a content to be displayed is defined as "Printing process is efficiently executed in the print system currently used".

In the case where "a1">"a2"≈"b"<"c", it is indicated that due to a low data transfer rate, the processing ability of the printer 10 and the data generating ability of the computer 50 are not efficiently used. Therefore, it is defined as a process to be performed that "Inquire the print control section 540 as to the currently used output port and other available output port and obtain them. Determine whether or not there is any output port having a higher transfer rate than the currently used one in the available output ports, referring to the port transfer rate table 553*a*. If there is an output port having a higher transfer rate than that of the currently used output port, a process is executed for estimating by how much percentage will be the transfer rate improved". Further, a content to be displayed is defined as "Due to a low data transfer rate, data processing time of the printer and the data generating ability of the computer are not efficiently used". Further, when there is an output port having a higher transfer rate than that of the currently used one, the content to be displayed is defined as "The currently used port is" XXX. "By replacing with" YYY, "the print processing time can be improved by" ZZZ "%". Here, XXX represents the currently used output port, and YYY represents the output port having a higher transfer rate than that of the currently used output port. ZZZ represents a result after estimation, i.e., by how much percentage will be the print processing time improved.

In the case where "a1">"a2"≈"b"≈"c", it is indicated that due to a low data generation processing time, the processing ability of the printer 10 is not efficiently used. Therefore, as a process, it is defined that "Obtain a type and clock frequency of the currently used CPU. Then, obtain a type and clock frequency of the CPU having a higher processing time, referring to the CPU processing time table 553b. Then, perform a process for estimating by how much percentage will be the data generation processing time improved by replacing the CPU". Here, the type and clock frequency of the CPU 51 is obtained from the information of the computer 50 itself, or by receiving an input from the user. Further, a content to be displayed is defined as "Due to a low data generation processing time, processing ability of the printer is not efficiently used". It is further defined that "Currently used CPU is" XXX. By replacing with the CPU of" YYY, "the print processing time can be improved by" ZZZ "%". Here, XXX represents the currently used CPU type and clock frequency, and YYY represents the type and clock frequency of the CPU having a higher transfer rate than that of the currently used CPU. ZZZ represents a result after estimation, by how much percentage will be the print processing time improved.

In the case where "a1"≈"a2"≈"b"<"c", it is indicated that even if the processing ability of the printer 10 is utilized at the maximum, the data generation processing time surpasses the processing ability of the printer. Therefore, it is defined as a process that "Detect another available printer, and obtain a maximum print data interpretation processing time stored in the printer processing ability storing section 130, from each detected printer. Then, determine whether or not there is a printer having a higher maximum print data interpretation processing time than that of the currently used printer. If there is a printer having a higher maximum print data interpretation processing time than that of the currently used printer, perform estimating by how much percentage will be the processing time improved. As a content to be displayed, it is defined that "Due to a low processing ability of the printer, processing ability of the computer is not efficiently used". Further, if there is a printer which has a higher maximum print data interpretation processing time than that of the currently used printer, it is defined that "Currently used printer is" XXX. "If printing is executed by the printer" YYY, "the printing processing time can be improved by" ZZZ "%". Here, XXX represents the currently used printer, and YYY represents the printer having a higher maximum print data interpretation processing time than that of the currently used printer. ZZZ represents a result after estimation, by how much percentage will be the print processing time improved.

It is to be noted that the rules above are just examples, and the processes and contents to be displayed in response to the result after obtaining each processing time are not limited to those as described above.

For example, in the case where "a1"≈"b"<"c", it is indicated that the print data generation processing time is excessive comparing to the entire printing processing time. Therefore, it is possible to provide a function to suppress the load of CPU 51 allocated to the print data generating process, by use of the process load adjusting means 555 as described below, so as to achieve "b"≈"c" regardless of the value of "a1". Accordingly, the ability of the CPU 51 can be allocated to other processes.

The processing time information displaying section 554 carries out processing to display on the display device 61, each processing time data obtained by the processing time data obtaining section 551 and an analysis result of the analysis processing section 552.

The process load adjusting section 555 carries out processing to adjust a load of the CPU 51 on printing process based on the analysis result of the analysis processing section 552. For example, if the printing process time of the CPU 51, that is, print data generation processing time is excessive with respect to the processing time of other processes, the processing load of the CPU 51 to the printing process is reduced so that a part of the processing ability of the CPU 51 can be allocated to other processes.

The processing time analyzing section 550 is implemented on the computer 50 when the CPU 51 executes a processing time analysis application program which is loaded on the RAM 52.

Each program for implementing on the computer 50 the functions as shown in FIG. 2 can be distributed by being recorded on a portable recording medium such as a CD-ROM. By reading the recording medium by the media reading device 63, it is possible to install the programs in the computer 50. Further, for example, it is also possible to install the programs by way of a computer network such as the Internet.

In FIG. 2, on the printer 10, a print control section 110, a print executing section 120, and a printer processing ability storing section 130.

The print control section 110 is implemented by CPU 12, RAM 13, ROM 14 and the like, interprets the print data transmitted from the computer 50, and executes printing based on the print data thus transmitted on the printer 10.

In the present embodiment, the print control section 110 is provided with a print data interpretation processing time calculating section 111. The print data interpretation processing time calculating section 111 calculates a processing time at which the print control section 110 interprets the print data. The processing time for interpreting the print data may be defined, for example, as the number of bytes which has been interpreted by the print control section 110 of the printer 10 within a unit of time. At this timing, the print data interpretation processing time calculating section 111 can calculate a processing time for interpreting the print data by integrating a size of each command constituting the print data, with regard to the print data interpreted within a unit of time (for example, one second).

The print executing section 120 is implemented by the print engine 15, and executes printing on a print sheet in accordance with a command from the print control section 110.

The printer processing ability storing section 130 is implemented by a nonvolatile recording medium such as ROM 14. As a processing ability of the printer 10, a maximum print data interpretation processing time of the print control section 110 is previously stored. The maximum print data interpretation processing time may be an actually measured value, or a theoretical value.

Figure 4:
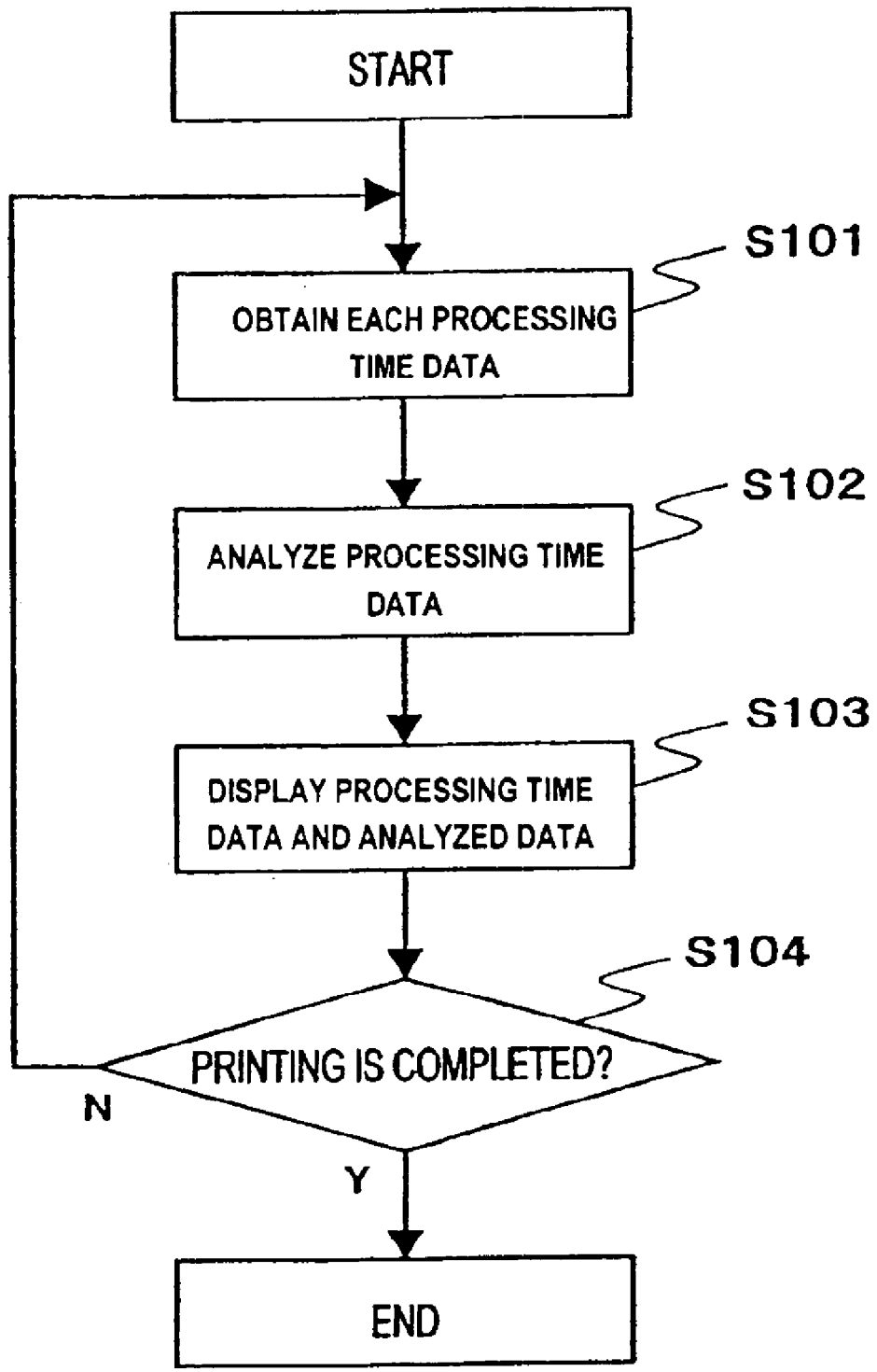
FIG. 4 is a flow diagram for explaining processes of a processing time analyzing section 550.

Next, referring to a flow diagram in FIG. 4, a process of the processing time analyzing section 550 will be explained.

This process is performed when the processing time analysis application program receives from a user a command which executes the processing time analysis, in the case where printing of a file is carried out while the file is being processed in an application program.

When the computer 50 starts printing, the processing time data obtaining section 551 of the processing time analysis section 550 obtains print data generation processing time from the print data generation processing time calculating section 521 of the print data generating section 520, obtains print data output processing time from the print data output processing time calculating section 541 of the output control section 541, obtains a print data interpretation processing time from the print data interpretation processing time calculating section 111 of the print control section 110, and obtains a maximum print data interpretation processing time from the printer processing ability storing section 130 (S101).

Next, based on each processing time data thus obtained, the analysis processing section 552 carries out analysis processing of the processing time data (S102).

The analysis processing of the processing time data is carried out based on the analysis rule table 553c which is recorded in the data-for-analysis storing section 553 as described above. That is, a corresponding measured result is extracted from each processing time data thus obtained, and a process corresponding to the measured result is performed. Further, according to the contents to be displayed defined in the analysis rule table 553c, an item to be displayed is determined. If required, the processing load adjusting section 555 suppresses the load of the CPU 51 on the print data generating process.

Then, the processing time information display section 554 generates processing time data thus obtained and image data to display the determined item to be displayed, as a print processing time analysis result, and outputs the data to the display device 61 (S103).

Figure 5:
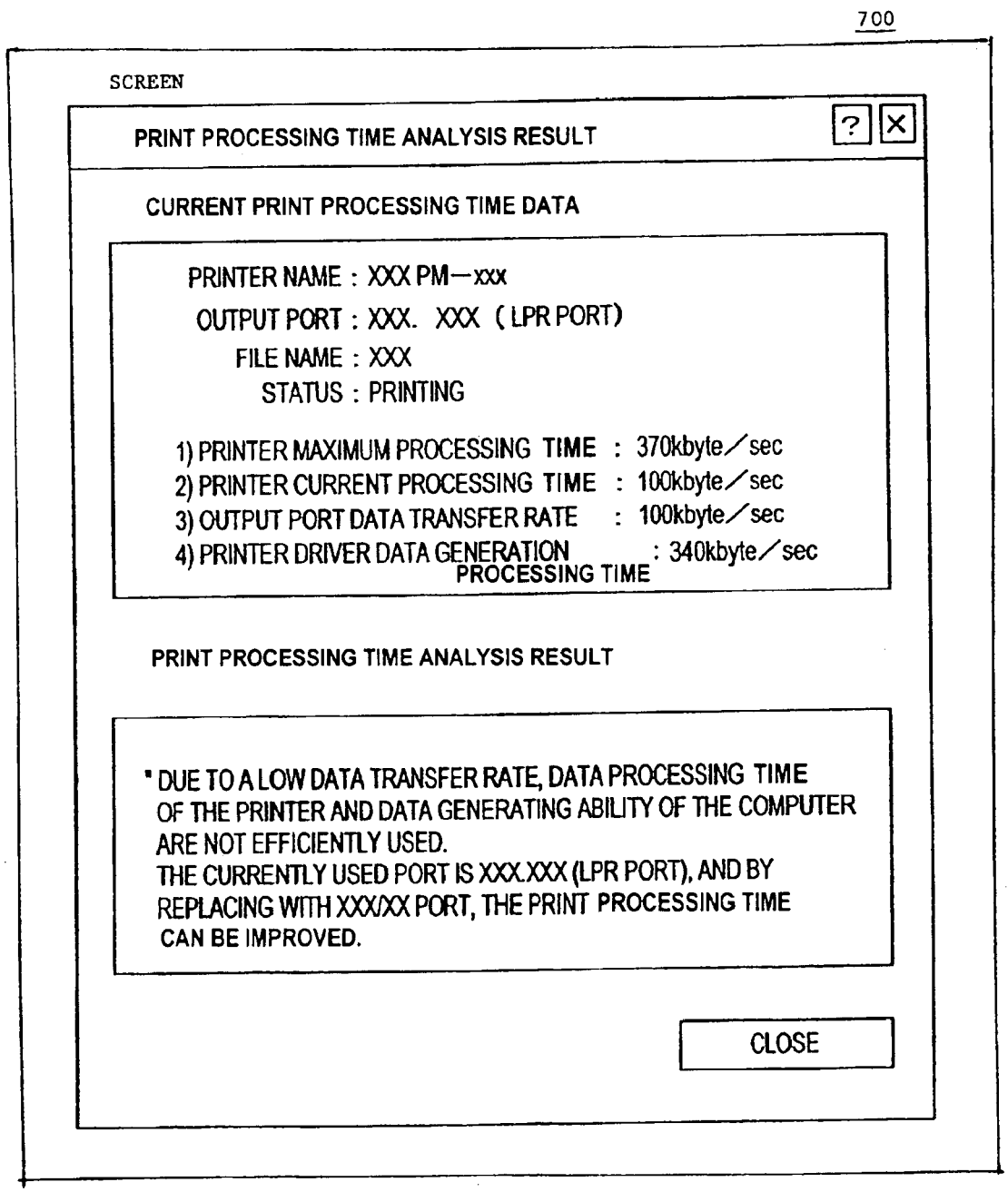
FIG. 5 is a diagram showing an example of a screen for displaying an analyzed result of the print processing time.

FIG. 5 is a diagram showing an example of a screen where a result of the print processing time analysis is displayed. As shown in FIG. 5, the screen 700 displaying the result of the print processing time analysis includes an area 701 for displaying each obtained printing processing time and an area 702 for displaying an analysis result.

In the present embodiment, obtaining each printing processing time and displaying the result of the analysis are carried out at predetermined intervals, for example, every 10 seconds, and displays a status of the printer 1 like a monitor. Therefore, until printing is completed, the processes from S101 are repeated (S104). It is to be noted here that as to the maximum print data interpretation processing time which is stored in the printer processing ability storing section 130, it is not necessary to obtain again, once it is obtained.

It is to be noted that the timing for obtaining each print processing time and displaying the analysis result is not limited to the predetermined intervals as described above. It is also possible that the print data generating section 520, the output control section 540 and the print control section 110 each obtains processing time, based on the time and data amount required for one printing process, and then one analysis result is obtained for the one printing process.

What is claimed is:

1. A print system having a printer host and a printer, the printer host generating print data based on image data and outputting the print data to the printer, and the printer interpreting the print data thus received and printing an image based on the print data, the print system comprising, a print data generation processing time calculating means which calculates a processing time for generating the print data;

a print data output processing time calculating means which calculates a processing time for outputting the print data;

a print data interpretation processing time calculating means which calculates a processing time for interpreting the print data; and a processing time analyzing means which obtains a print data generation processing time calculated by the print data generation processing time calculating means, a print data output processing time calculated by the print data output processing time calculating means and a print data interpretation processing time calculated by the print data interpretation processing time calculating means, and outputs image data for displaying each processing time thus obtained;

a printer ability storing means which stores a maximum processing time for interpreting the print data of said printer, wherein, said processing time analyzing means obtains from said printer ability storing means the maximum processing time for interpreting the print data, and includes a display of the maximum print data interpretation processing time in said image data; and an analysis information storing means which stores an analysis rule which defines processes to be performed by said processing time analyzing means and contents to be displayed with regard to printing process statuses, respectively corresponding to relationships among the print data generation processing time, the print data output processing time, the print data interpretation processing time, and the maximum print data interpretation processing time, wherein, said processing time analyzing means refers to said analysis rule, and performs a process as defined in said analysis rule, based on thus obtained print data generation processing time, print data output processing time, print data interpretation processing time, as well as including in said image data the contents to be displayed, which are defined in said analysis rule.

2. A print system according to claim 1, wherein, the processes to be performed by said processing time analyzing means, which are defined in said analysis rule, may include a process for suppressing a processing time for generating the print data of said print data generation processing time calculating means.

* * * * *